(12) United States Patent
Gaskill

(10) Patent No.: US 11,681,857 B2
(45) Date of Patent: Jun. 20, 2023

(54) METHOD AND DEVICE FOR RENDERING TEXT WITH COMBINED TYPOGRAPHICAL ATTRIBUTES FOR EMPHASES TO A COMPUTER DISPLAY

(71) Applicant: Ascender AI LLC, McClean, VA (US)

(72) Inventor: Braddock Gaskill, Alhambra, CA (US)

(73) Assignee: Ascender AI LLC, McLean, VA (US)

( * ) Notice: Subject to any disclaimer, the term of this patent is extended or adjusted under 35 U.S.C. 154(b) by 0 days.

(21) Appl. No.: 17/986,784

(22) Filed: Nov. 14, 2022

(65) Prior Publication Data

US 2023/0070363 A1    Mar. 9, 2023

Related U.S. Application Data

(60) Division of application No. 17/480,077, filed on Sep. 20, 2021, now Pat. No. 11,500,912, which is a continuation-in-part of application No. 29/752,030, filed on Sep. 24, 2020.

(60) Provisional application No. 63/080,428, filed on Sep. 18, 2020, provisional application No. 63/080,635, filed on Sep. 18, 2020.

(51) Int. Cl.
| | | |
|---|---|---|
| *G06F 40/103* | (2020.01) | |
| *G06F 40/109* | (2020.01) | |
| *G06F 16/34* | (2019.01) | |
| *G06F 3/04817* | (2022.01) | |
| *G06F 40/284* | (2020.01) | |
| *G06F 40/205* | (2020.01) | |

(52) U.S. Cl.
CPC .......... *G06F 40/103* (2020.01); *G06F 40/109* (2020.01); *G06F 3/04817* (2013.01); *G06F 16/345* (2019.01); *G06F 40/205* (2020.01); *G06F 40/284* (2020.01)

(58) Field of Classification Search
CPC .............................. G06F 40/103; G06F 40/109
See application file for complete search history.

(56) References Cited

U.S. PATENT DOCUMENTS

| 5,224,038 A * | 6/1993 | Bespalko | G06F 40/191 |
| | | | 715/234 |
| 5,557,722 A * | 9/1996 | DeRose | G06F 40/117 |
| | | | 715/776 |
| 5,625,773 A * | 4/1997 | Bespalko | G06F 40/189 |
| | | | 715/210 |
| 5,870,608 A * | 2/1999 | Gregory | G06F 40/284 |
| | | | 717/131 |
| 2011/0106524 A1* | 5/2011 | Mousaad | G06F 40/263 |
| | | | 704/8 |
| 2021/0165960 A1* | 6/2021 | Eisenschlos | G06F 40/284 |
| 2022/0138402 A1* | 5/2022 | Kraus | G06F 40/109 |
| | | | 715/269 |
| 2022/0156489 A1* | 5/2022 | Agarwal | G06F 40/106 |

FOREIGN PATENT DOCUMENTS

| EP | 3614279 A1 * | 2/2020 | ........... G06F 40/109 |

* cited by examiner

*Primary Examiner* — Asher D Kells
(74) *Attorney, Agent, or Firm* — Law Office of Oliver Edwards LLC; Oliver Edwards

(57) ABSTRACT

The present disclosure relates to UI systems and processes including rendering of text in a combination of styles and sizes to a computer graphics display. Text may be rendered with one or more emphases to modify style, size, and weight according to emphases weightings and or relative positions of text to be emphasized.

12 Claims, 13 Drawing Sheets and Customs Enforcement (ICE) earlier this month that would have prohibited foreign students from taking online-only coursework in the fall, walking back an announcement that elicited a flurry of lawsuits and withering criticism from schools, lawmakers and states. During a hearing Tuesday afternoon in which she was expected to rule on whether to block the recent guidance for student visas, Judge Allison Dale Burroughs of the U.S. District Court in Boston said ICE had agreed to scrap the directive. Burroughs said the government and plaintiffs in a lawsuit filed by Harvard and MIT had reached an 73   71   74   72

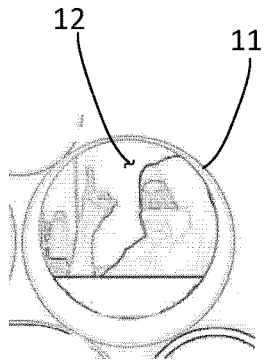 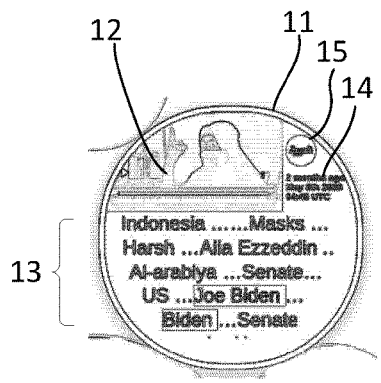 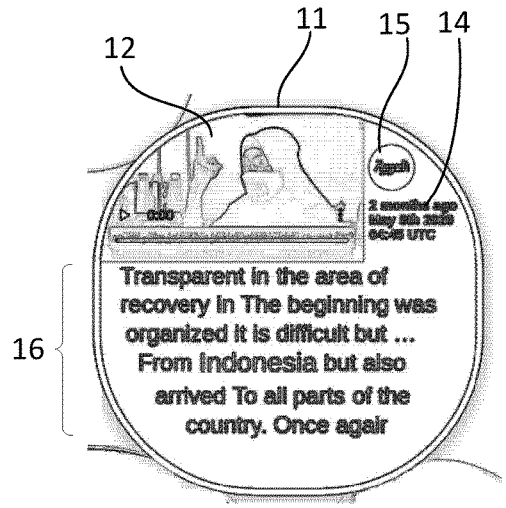
FIG. 1A  FIG. 1B  FIG. 1C
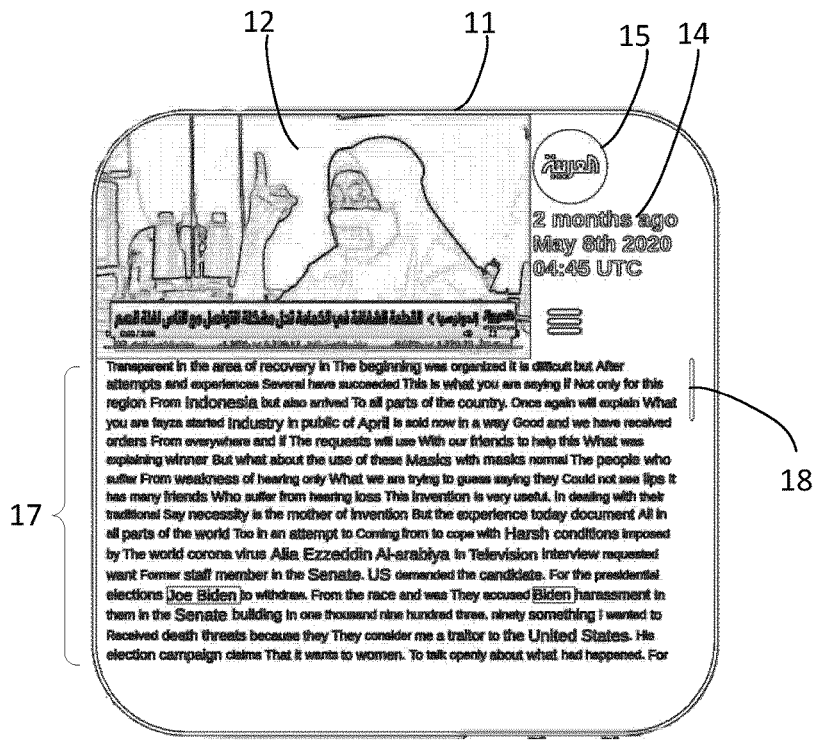
FIG. 1D and Customs Enforcement (ICE) earlier this month that would have prohibited foreign students from taking online-only coursework in the fall, walking back an announcement that elicited a flurry of lawsuits and withering criticism from schools, lawmakers and states. During a hearing Tuesday afternoon in which she was expected to rule on whether to block the recent guidance for student visas, Judge Allison Dale Burroughs of the U.S. District Court in Boston said ICE had agreed to scrap the directive. Burroughs said the government and plaintiffs in a lawsuit filed by Harvard and MIT had reached an 71  72  73  74

FIG. 7

82B
d on social media and by Baghdad residents of being incompetent. He made headlines in March 2014 when he described his city, beset by brutal sectarian violence and rife with corruption, as " more beautiful than New York and Dubai . " On Wednesday , the repatriation department at the Iraqi Commission of Integrity said it was working on repatriating the accused fugitive from Syria . " We are working on completing Abaob 's file and to hand it to the Iraqi emba 82A
83B  81  83A

FIG. 8

METHOD AND DEVICE FOR RENDERING TEXT WITH COMBINED TYPOGRAPHICAL ATTRIBUTES FOR EMPHASES TO A COMPUTER DISPLAY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR § 1.57.

SUMMARY

In some aspects, the techniques described herein relate to a method for displaying on a computer display information about electronic documents matching selection criteria and supporting user interaction therewith, the method including steps executed on one or more computer processors of: running each electronic document through a Natural Language Processing module to tokenize text of the electronic document and assign part-of-speech tags and named entity tags to the tokenized text; running each electronic document's tokenized text, part-of-speech tags, and named entity tags through a summarization algorithm to create a summarization of the electronic document; computing a current bubble size for each electronic document based on, at least in part, a relevancy score for the electronic document; and rendering on the computer display, for each electronic document, a summary of the electronic document in a contiguous bubble region sized proportionately to the electronic document's current bubble size, the summary including an image extracted from the electronic document, if any, and, according to threshold criteria: keywords selected from the tokenized text of the electronic document if the electronic document's current bubble size is in a first range of thresholds of the threshold criteria, the summarization of the electronic document if the electronic document's current bubble size is in a second range of thresholds of the threshold criteria, or a full-text view of the electronic document if the electronic document's current bubble size is greater than the second range of thresholds of the threshold criteria.

In some aspects, the techniques described herein relate to a method wherein the keywords selected from the tokenized text of the electronic document are named entities. In some aspects, the techniques described herein relate to a method wherein the electronic documents include one or more of text documents, videos, images, web pages, social media, and combinations thereof.

In some aspects, the techniques described herein relate to a method wherein the full-text view of an electronic document that is a live networked electronic document includes an embedded window for the live networked electronic document. In some aspects, the techniques described herein relate to a method, further including: establishing a proxy server; and fetching the live networked electronic document via the proxy server. In some aspects, the techniques described herein relate to a method wherein the embedded window is established by means of an iframe.

In some aspects, the techniques described herein relate to a method, further including: optimizing arrangement of the contiguous bubble regions on the computer display to be substantially non-overlapping and to display a substantially maximized quantity of the contiguous bubble regions for a current zoom level, excepting that a focused contiguous bubble region may be permitted to overlap other contiguous bubble regions.

In some aspects, the techniques described herein relate to a method, further including: accepting a user zoom gesture; determining a zoom level change in response to the user zoom gesture; scaling the current bubble size for each electronic document in proportion to the zoom level change; and repeating the optimizing and rendering steps.

In some aspects, the techniques described herein relate to a method, further including: accepting a user zoom gesture; determining a zoom level change in response to the user zoom gesture; determining S, a number of animation steps to smoothly animate the zoom level change; determining an ordered monotonic series of S bubble sizes for each electronic document between the electronic document's current bubble size and a final bubble size that is in proportion to the current bubble size and the zoom level change; and iterating S animations by setting each electronic document's current bubble size to a next in the electronic document's series of S bubble sizes and repeating the optimizing and rendering steps.

In some aspects, the techniques described herein relate to a method wherein the user zoom gesture is a focus gesture on a selected one of the contiguous bubble regions, wherein: designating the selected one of the contiguous bubble regions a focused contiguous bubble region; determining a zoom level change includes determining a zoom level that would result in a full-text view of the focused contiguous bubble region when the animations are complete; iterating S animations includes smoothly panning the contiguous bubble regions such that the focused contiguous bubble region is fully and centrally viewable; and the user is permitted interaction with the full-text view of the focused contiguous bubble region.

In some aspects, the techniques described herein relate to a method wherein the permitted interaction is one of scrolling or selecting a hyperlink.

In some aspects, the techniques described herein relate to a method wherein if an iteration step would cause an electronic document's bubble size to satisfy different threshold criteria than the electronic document's current bubble size, the rendering associated with that iteration step includes a smooth transition between keywords and summarization or summarization and full-text view.

In some aspects, the techniques described herein relate to a method wherein a quantity and sizes of keywords displayed in an electronic document's contiguous bubble region are optimized to fill available space in the contiguous bubble region.

In aspects of certain embodiments, the techniques described herein relate to a method for maintaining a position on a computer display of a target word in a body of text subject to modifications, the display driven by a rendering engine, the method including: determining an initial coordinate position of the target word; dividing the body of text into an ordered set of words; calculating a width and a height of each word as the word would be rendered by the rendering engine applying style information applicable to the word; forward rendering, including starting at the target word and the target word's coordinate position, rendering in sequence each word, adding a line break preceding the word if the word would not fit on a current line based on the word's calculated width and height; backward rendering, including starting at the target word and the target word's position, rendering backward each prior word before the target word in reverse sequence, adding a line break following the word if the word would not fit on a current line based on the word's calculated width and height; if the body of text is modified by an addition or deletion of words, repeating the forward rendering and backward rendering steps; and if the body of text is modified in a manner affecting the width or height of one or more words, repeating the dividing, calculating, forward rendering, and backward rendering steps.

In aspects of certain embodiments, the techniques described herein relate to a method for maintaining a position on a computer display of a target word in a body of text subject to modifications, the display driven by a rendering engine, the method including: determining an initial coordinate position of the target word; dividing the body of text into an ordered set of words; calculating a width and a height of each word as the word would be rendered by the rendering engine applying style information applicable to the word; forward rendering, including starting at the target word and the target word's coordinate position, rendering in sequence each word unless the word would not fit on a current line based on the word's calculated width and height, whereupon breaking the word into a leading portion and a trailing portion such that the leading portion fits on the current line, rendering the leading portion, rendering a line break, and rendering the trailing portion if; backward rendering, including starting at the target word and the target word's position, rendering backward in reverse sequence each prior word before the target word unless the word would not fit on a current line based on the word's calculated width and height, whereupon breaking the word into a leading portion and a trailing portion such that the trailing portion fits on the line, rendering the trailing portion, rendering a line break, and rendering the leading portion; if the body of text is modified by an addition or deletion of words, repeating the forward rendering and backward rendering steps; and if the body of text is modified in a manner affecting the width or height of one or more words, repeating the dividing, calculating, forward rendering, and backward rendering steps.

In some aspects, the techniques described herein relate to a method wherein rendering of a word that will be broken is effected by rendering the word to be split on both the current line and a next line, in the rendering direction, subject to cropping boxes which cut off the trailing or leading portions or the word.

In aspects of certain embodiments, the techniques described herein relate to a method for rendering of text in a combination of styles and sizes to a computer graphics display with a rendering engine, the method including steps of: running the text through a Natural Language Processing module to break the text into word or character tokens, each token having an associated sequential index according to its order in the text; instantiating a set of Emphases, where each Emphasis specifies a parameter for styling of text and a position index or range of positions indicating how the Emphasis affects the rendering of tokens in the text, wherein multiple Emphases may affect any given token and the Emphases may overlap; combining topographical attributes of multiple Emphases by a weighted average, a linear combination of attributes, or a mathematical transformation; and mapping the set of weighted Emphases to the style, size, color and other typographical attributes of the text corresponding to each token by combining relevant Emphases styles.

In some aspects, the techniques described herein relate to a method, wherein mapping the set of weighted Emphases is performed by specifying a range including a start position and an end position, and a fixed weight for each Emphasis to the text corresponding to the tokens within the specified range.

In some aspects, the techniques described herein relate to a method, wherein mapping the set of Emphases includes specifying for each Emphasis a weight, a token index for a center, and a standard deviation, and then calculating the weight for each Emphasis for a token using a distance from the token index to the Emphasis center and computing a weight using a gaussian decay function with the standard deviation.

In some aspects, the techniques described herein relate to a method wherein the weight, position, or other attribute of one or more Emphases is incrementally modified to produce a series of renderings of the text which may be displayed as a smooth animation or manipulation of the text.

BRIEF DESCRIPTION OF THE DRAWINGS

FIGS. 1A-1D illustrate portions of display captures of exemplary document renderings of varying levels of detail in accordance with embodiments of the invention with FIG. 1A illustrating image only, FIG. 1B illustrating image with keywords, FIG. 1C illustrating image with summary, and FIG. 1D illustrating image with full text.

FIG. 7 illustrates exemplary text which has been rendered using NLP-based Emphasis in accordance with an embodiment of the invention.

FIG. 8 illustrates a sample of text on which Emphasis has been applied at the word level in accordance with an embodiment of the invention.

DETAILED DESCRIPTION

Figure 2:
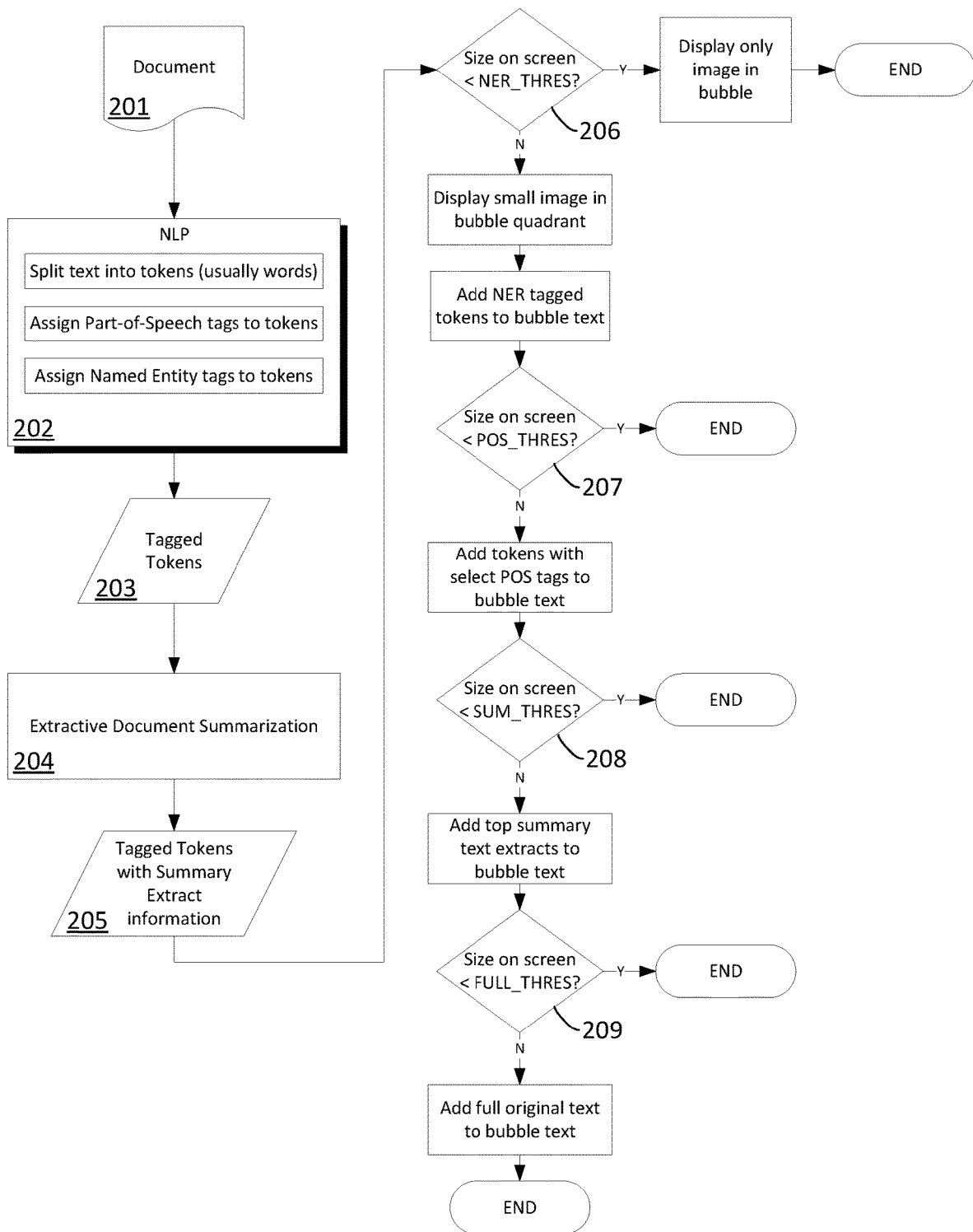
FIG. 2 illustrates an exemplary method for rendering text and images at multiple levels of detail in accordance with an embodiment of the invention.

As used in this description, a Document is defined as an artifact of information, such as a text document, a video, an image, a web page, social media comment, or some combination of thereof. A Document may have multiple Variants, such as translations from the original language into other languages.

As used in this description, a Variant is an alternative form of a Document. For example, a document of written text may have one Variant with the text in the original English, and another Variant with a translation of the text to Arabic.

In some scenarios, a Document is displayed in a contiguous region that may be circular, semi-circular, or generally rectangular. The shape in which a Document is rendered in some form may be referred to as a Bubble.

I. Rendering document with multiple levels of detail

I.1 Overview

In accordance with an embodiment, a Document may be a body of text, a video, an image, a social media comment, etc. A Document may be rendered into a Bubble—a contiguous region that may be circular or rectangular—such as Bubbles 11 in FIGS. 1A-1D. As a Bubble is zoomed it becomes larger to fill more and more of the available screen area. In accordance with an embodiment, increasing screen area of a Bubble is used to display more of a Document in a variety of ways outlined below.

I.2 Image Only View

A Document often has an associated image. This image may be a photograph associated with a news article, or a still frame from a video, or an active video. Referring to FIG. 1A, when a Bubble 11 is zoomed out far enough that there is not enough space to render text, the image or video 12 can be rendered as large as possible within the Bubble. This allows a user to visually obtain clues about the content of the Document.

I.3 Keywords View

Referring to FIG. 1B, when enough screen area is available in Bubble 11 to render some text, the relative size of image 12 may be reduced into a subregion of the Bubble 11—the top of the Bubble for instance—with Document keywords 13 displayed in a separate sub region—below for instance. The keywords may be obtained by any number of techniques. In one embodiment, a statistical or neural Named Entity Recognition (NER) model is applied to obtain and identify keywords in the text such as person names, placenames, geographic points of interest, currency, and other classes. In certain embodiments top keywords 13 obtained by NER or other methods are displayed as illustrated in FIG. 1B. Additionally, Document information such as Document time 14 and Document source identifier 15 may be displayed in Bubble 11.

I.4 Document Summary View

Referring to FIG. 1C, when Bubble 11 is enlarged enough to legibly display longer segments of text, keywords 13 as illustrated in FIG. 1B are replaced with artificial sentences 16 that summarize the meaning of the entire text. This encompasses the field of Document Summarization in machine learning. A statistical or neural network model is used to create the summarization.

Summarization techniques fall in two categories: abstractive and extractive. Use of extractive summarization permits gradually expanding of the summary until the full text is visible in a gradual transition.

I.5 Full-Text View

Referring to FIG. 1D, when Bubble 11 is large enough to legibly render full text of a Document, then the Document text is rendered in a scrollable sub-region 17 of Bubble 11—below the image or video, for example. In this mode, pan and zoom controls may be suspended to allow the user to concentrate on the given Document, and the user can scroll through the full text using, for example, scrollbar 18 or mouse or touchscreen gestures. The text may be rendered with emphasis in accordance with NLP tags, as described in a later section.

I.6 HTML Web Page View

Where a Document originates from or is associated with a World Wide Web (WWW) URL, an alternate to Full-Text View can be provided where instead of simply providing the text of a Document, the associated web page can be rendered seamlessly inside a Bubble.

This is made possible by the "iframe" HTML tag which allows a web browser to render a web page within another web page, with some restrictions. In certain embodiments, a web "proxy", which is a web server URL, fetches web pages on behalf of the client to bypass some restrictions.

The iframe has no knowledge of the location or size of the enclosing Bubble. It may be necessary to scale and position the iframe within the Bubble on a frame-by-frame basis to maintain the illusion that the web page is embedded firmly in the Bubble. This can be accomplished by using CSS "transform" directives.

I.7 Smooth Transitions

While the user is "zooming" onto a Document Bubble or set of Document Bubbles, smooth transitions are made between the levels of detail. Images at the image-only phase are smoothly morphed into their new position and relative size. NER Keywords meld into summary text and then into full text smoothly using techniques described later. The shape of the Bubble can also morph smoothly from a circle when small, to a rectangle with rounded corners when large and focused.

I.8 Method for Rendering Text and Images at Multiple Levels of Detail

With reference to FIG. 2, the method starts with Document 201 which consists of text and optionally an image. First the Document text is run through Natural Language Processing module 202 to divide it into tokens (in most cases a token is a word), analyze the text to assign part-of-speech tags and named entity tags.

The output of the NLP process is a list of tagged tokens 203 which are then fed through document summarization algorithm 204. The summarization algorithm, one of many well known in the field, determines which parts of the text best summarize the meaning and identifies the tokens for the summarization 205.

The method then makes a series of decisions of what tokens to include in the display Bubble based on the display size of the representation on screen of the Document (the Bubble as defined previously). In steps 206-209, these decisions decide the content of the Bubble according to display size thresholds. The thresholds may be variable or constant. A ratio of the display width to the font size of the display can be used to determine such thresholds. In certain embodiments, the thresholds may be identified as:

NER_THRES—minimum threshold size needed to display tokens with select NER tags;

POS_THRES—minimum threshold size needed to display tokens with select POS tags;

SUM_THRES—minimum threshold size needed to display top document summarization extracts; and FULL_THRES—minimum threshold to display all tokens.

At the end of this process there is a list of tokens and an image to display in a Bubble.

II. Rendering multiple documents in view

II.1 Overview

With reference to FIGS. 3A-3F, the user is presented with a user interface 110 including a search bar 115, filtering controls 116, and a set of rendered Bubbles, Bubbles 112 and 113, for example, representing Documents. This provides the user with an environment in which she can explore the content. The Documents presented may represent, for example, the top 50 documents matching a search query against a database of millions of documents. Or the documents may represent a set of live videos of a sporting event that the user may arrange to best view the event. A user may use keyboard, mouse or touch gestures to zoom and pan the content. FIGS. 3A-3F are ordered in increasing zoom levels and, if rendered from a single zoom or focus gesture, would represent select frames of a smooth transition animation of the zoom.

II.2 Topic Classification

In some embodiments, it is useful to place Documents that are similar near each other in the multiple document layout. This allows the user to find and browse an area of related documents that are of interest to her.

There are many dimensionality reducing techniques in the literature that could be used. In some embodiments, the option used is dividing the Documents into clusters, where each cluster represents a "topic". Documents in the same topic can be about similar subject matter.

Most applicable reducing techniques involve processing the Document into a single vector of real numbers, called an "embedding". There are many techniques in the literature for generating document embeddings from text. In some embodiments a model known as the Universal Sentence Encoder (USE) is used. In other embodiments a Bidirectional Encoder Representations from Transforms (BERT) model is used on Document text, transcript, keywords, or headlines depending on the source.

BERT or USE or other techniques represents each Document as a vector of real numbers, known in the field as an "embedding".

To map embedding vectors for each Document into discrete clusters, many clustering techniques can be used. In some embodiments a Gaussian Mixture Model (GMM) is used. In others, K-means is used; both are well documented in the field. These techniques assign each Document to a topic cluster.

II.2.1 Method of Document Topic Assignment

Figure 4:
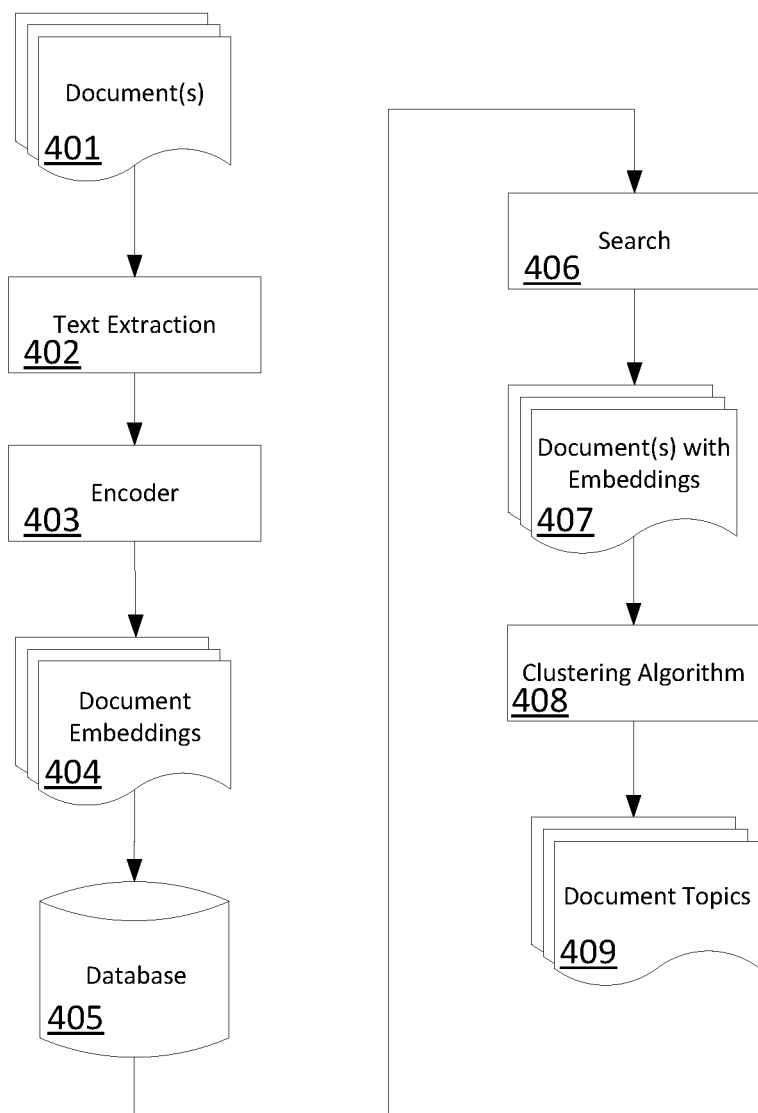
FIG. 4 illustrates an exemplary method for document topic assignment in accordance with an embodiment of the invention.

FIG. 4 illustrates a method for the clustering of documents into a number of "topics," starting with a set of Documents 401 to ingest.

For each Document, text is extracted 402 on which the embedding is to be based. Extraction of text is relatively straightforward but varies by the Document type and origin. Valid text extraction techniques include the use of the Document title or headline (if it has one), the complete body of the Document, or a summarization of the Document.

Once the text is selected, it is run through an Encoder 403 described in the previous section. It generates a semantic vector, also known in the field as an "embedding" 404.

The embeddings are then stored in a database 405 associated with the original Documents. If desired, it is possible to omit the storage in the database to process a set of Documents after the search is performed, some of which may not have seen before. It is desirable to generate the embeddings before a search is performed because it is computationally expensive. However, it is not always possible to have processed the search results beforehand.

Assuming storage of the embeddings in the database, when the user searches 406 the database 405, both the matching documents and their embeddings 407 are retrieved.

Then the high dimensional embeddings are run through a clustering algorithm 408 to group "similar" Documents into a topic (each topic is assigned a number, or id). This is discussed in more technical detail in the prior section. The result is a topic id associated with each Document.

II.3 Optimized Layout

The layout algorithm takes many Bubbles, each tagged with a topic category, and produces a layout in which the Bubbles for similar Documents are, in general, placed near each other. This is achieved with an iteratively optimized layout. In addition to the initial iterative layout, the layout will smoothly adapt to changes in the scene, such as the insertion of a new Bubble or a removal of a Bubble.

II.3.1 Force Directed Graph Layout

To layout Bubbles, each with an associated Topic, a Force Directed Graph is used. A Force Directed Graph consists of "nodes" and "links" between them. In certain embodiments, "nodes" are Bubbles. Bubbles with the same Topic number are connected together with a "link". The Force Directed Graph can utilize a few physics modeling rules whereby nodes are attracted to each other, but collisions between nodes are repulsed. Nodes with links may be more attracted to each other.

The Force Directed Graph may be an iterative process. The layout starts in a mostly random state, and then the graph rules for attraction and repulsion are calculated and the Bubbles are moved into place, such that Bubbles with the same topic are typically neighbors to each other.

If the size of the display window changes, or Bubbles are added or removed due to filtering, then the Force Directed Graph algorithm recomputes the layout and the iterative change to position is displayed as an animation to the user.

II.3.2 Method of Graph Layout and Display.

Figure 5:
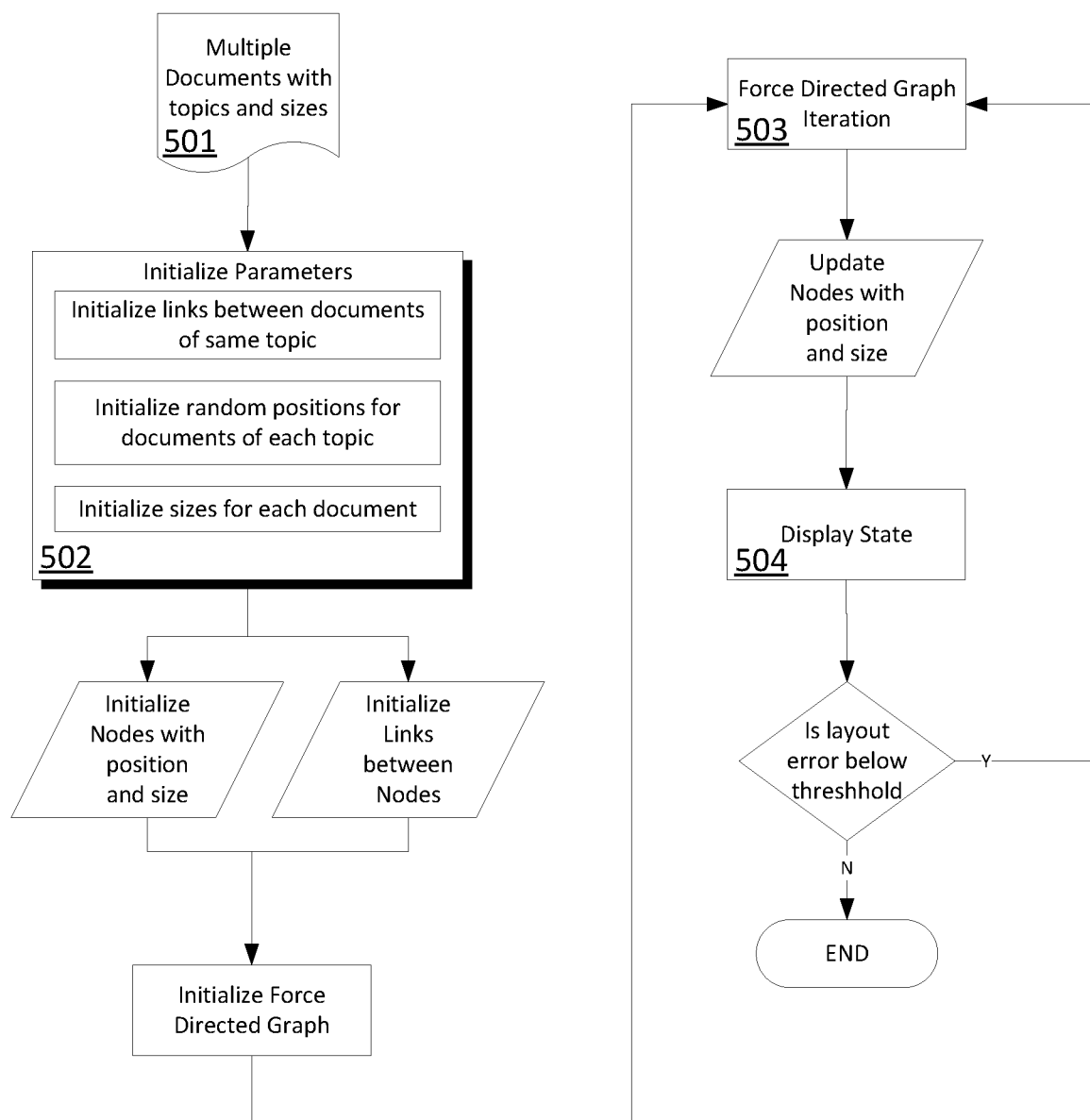
FIG. 5 illustrates a exemplary method of graph layout and display in accordance with an embodiment of the invention.

As illustrated in FIG. 5, a method graph layout and display is provided, starting with a set of Documents with associated topics 501. See section I.2 "Topic Classification" for more details. A "size" is associated with each Document. This is the display size radius of the Document on the screen. It can be based on search relevancy scores, sentiment analysis, or any other metric.

Model Parameters are initialized in 502. All documents of the same topic are fully linked together with an attractive force. All documents of the same topic are also assigned the same random position for that topic. This initializes the documents of the same topic into the same initial positions, which helps hold them together during the graph iterations. Finally, the size parameters are initialized for each document. This determines the on-screen size of each Bubble and informs the iterative layout process to avoid collisions between bubbles.

At step 503, the force directed graph model is called for a single iteration, during which it evaluates the forces imposed on the nodes (documents) by mutual attraction, link attraction, and collision repulsion. From this iteration an updated data structure of node positions is obtained, with each node associated with one document.

While still iterating, the display of the Bubbles is updated on screen according to the new node positions at 504. This allows the user to see the bubbles gradually move into their final positions, or adapt to new filtering.

At the end of each iteration, the layout error is checked if it is below a threshold. If the error meets the threshold, the iterations are ended; otherwise additional iterations are run.

II.4 Color and Size

The background color of each Bubble can be set according to the topic of that Bubble's Document. Each topic may be assigned a color, and each Bubble of that topic uses the assigned color in, for example, its background color, outline or other manner.

In some embodiments, color can be used for other purposes such as highlighting age or source or language of the Document.

Size of the Bubbles can be used in many ways. In one embodiment, size is used to indicate relevancy to the search just performed in which Bubbles representing more relevant Documents are larger. In other instances, size may indicate age, length, or popularity. The Force Directed Graph takes into account the size of the Bubbles during layout.

II.5 Culling and Deferred Rendering Optimizations

Rendering large numbers of feature-rich Bubbles is taxing even on a modern web browser. According to embodiments of the invention, two techniques make it manageable:

First, Bubbles which are off-screen may be "culled". Such Bubbles are not rendered since they are not visible.

Second, an inventive "deferred rendering" technique is used. During intensive zoom in and out operations, all Bubbles are needed to update their display on each frame. This is too intensive for many browsers. So instead, during the movement of a zoom, only the focused Bubble is updated, and the remaining bubbles are updated when the motion ends. This technique combined with a transformation applied to the deferred Bubbles to scale their content, the motion appears fluid until the actual zoom update.

II.5.1 Method for Culling and Deferred Rendering Optimization

Figure 6:
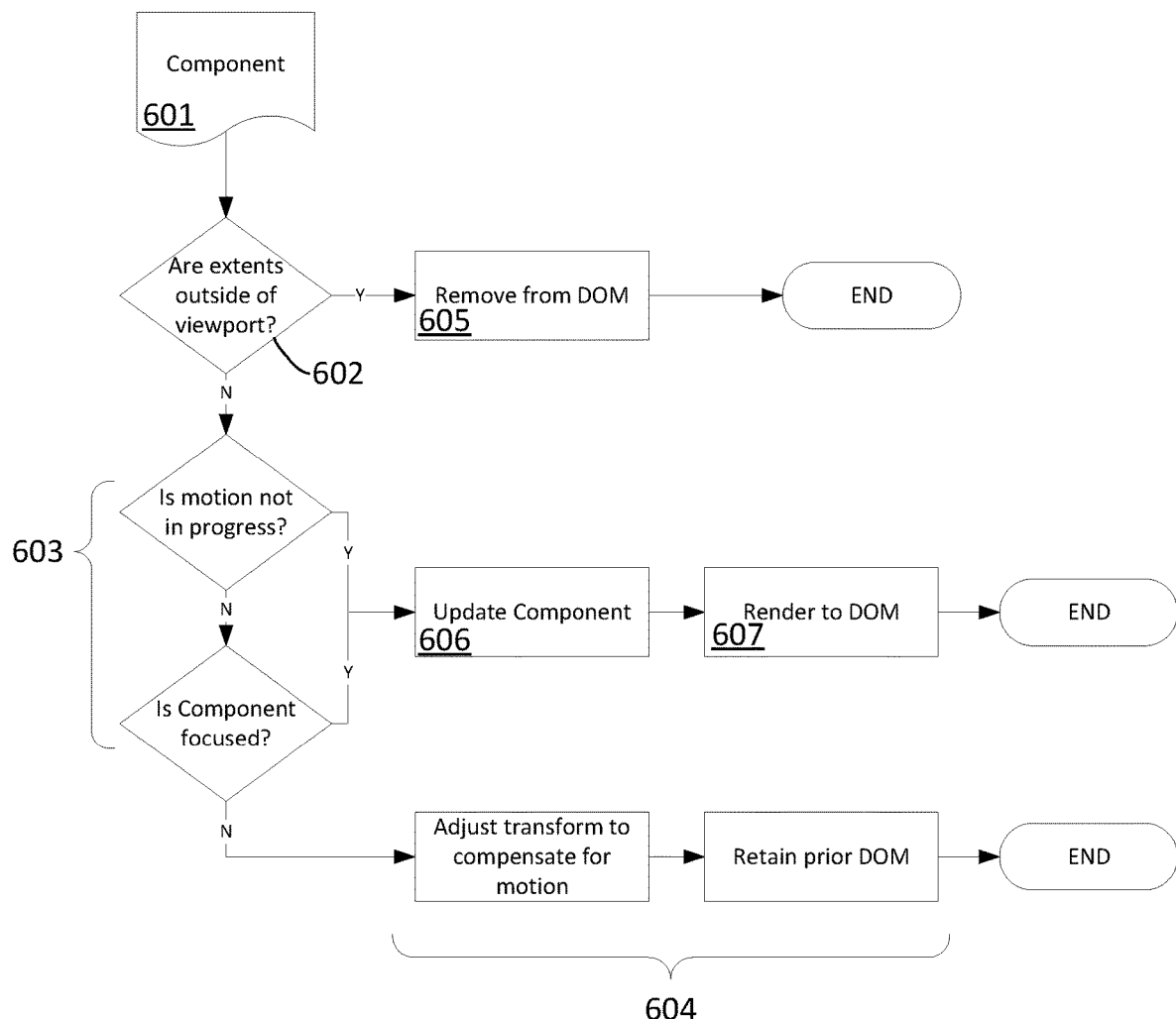
FIG. 6 illustrates an exemplary method for culling and deferred rendering optimization in accordance with an embodiment of the invention.

FIG. 6 illustrates an exemplary method for culling and deferred rendering optimization. Each Bubble is represented in the view graph as a "Component" 601. For each Component, the logic depicted in FIG. 6 is performed.

If the area extents of the Component are out of the bounds of the viewport as determined at step 602—i.e., the Component would be rendered entirely off-screen—then the elements of the Component are removed from the Document Object Model (DOM) at step 605.

If there is movement underway, a pan or zoom manipulation for example, then many Components will need to update their state and their DOM representation. Often more work needs to be done than can be accomplished in a single frame, causing uneven rendering or a delayed response. To avoid these performance issues, updates of Components that are not currently "focused"—i.e., not selected by the user—are deferred at steps 603. Otherwise, step 606 updates the Component and step 607 renders the update to the DOM.

A deferred Component is still displayed on the screen, and its DOM elements remain in the DOM, however it is not actively updated. The only update that occurs is an adjustment to the Component's Cascading Style Sheet (CSS) transformation which is adjusted for the pan and zoom change in steps 604. This preserves the illusion of a Component moving through space as a solid body, but the details of the rendering are not updated until the motion is complete.

In an alternative embodiment, the same steps as above are taken, except non-focused Components are allowed to update in incremental groups sufficiently small to avoid the performance issues and maintain smooth framerates.

III. Focus and Navigation

III.1 Navigation

The Bubbles represent the Documents at multiple levels of detail, as described previously. The user pans and zooms on the display of multiple Bubbles, and zooms in on those of interest. As the screen area available to a Bubble increases, it displays more detail.

Alternatively, the system can be configured to allow the user to zoom in on a single Bubble without zooming the entire multi-document display. A single Bubble can hover above neighboring Bubbles, or neighboring Bubbles can move out of the way of an enlarged focused Bubble using a layout optimization algorithm.

The user pans the display by clicking and dragging the mouse. On a touch screen the user pans simply by dragging the scene around with her finger. With a mouse, the user can zoom using the scroll wheel. On a touch screen device such as a tablet, the user can zoom using a "pinch-to-zoom" gesture. With a mouse or a touch screen the user can do a fast zoom to a particular Bubble by double-clicking on the Bubble of interest.

III.2 Focus

At any given time, a single Bubble can have "Focus". A user focuses a Bubble by clicking on it. A Focused Bubble can be visually indicated, for example, by rendering its border white. A Focused Bubble has rendering priority (see prior sections on deferred rendering). Focusing a Bubble will often load additional information about that Document into that Bubble, including, for example, the actual video stream. In some modes, only a focused Bubble can play audio and video.

III.3 Single Focus View

When the user wants to simply read the full text of the Document, they may zoom into the Focused Bubble into a "Single Focus View". This view may be triggered by double-clicking a Bubble. The Bubble zooms to occupy a substantial portion of the viewing window, in some embodiments perfectly matching the size of the viewing window. Other Bubbles still visible outside of the focused Bubble may be faded. Normal pan/zoom navigation mouse and touch gestures may be disabled, allowing the user to scroll the text with a standard scroll wheel and to control play of a video, if any.

Single Focus View may be exited by again double-clicking the focused Bubble, or clicking anywhere outside of the focused Bubble.

Figure 3A:
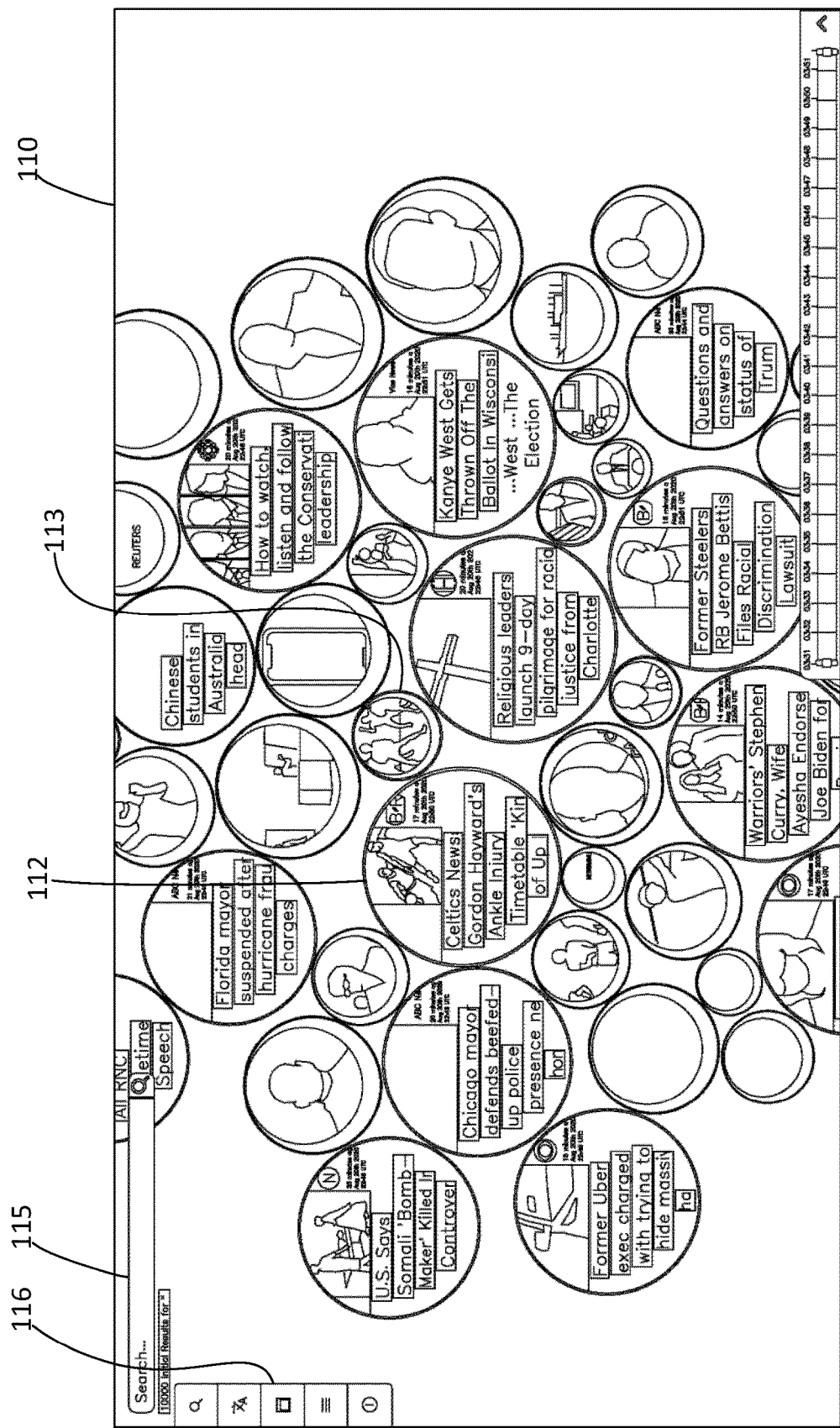
FIGS. 3A-3F illustrate an exemplary user interface displaying information about Documents at increasing levels of zoom and detail.
Figure 3B:
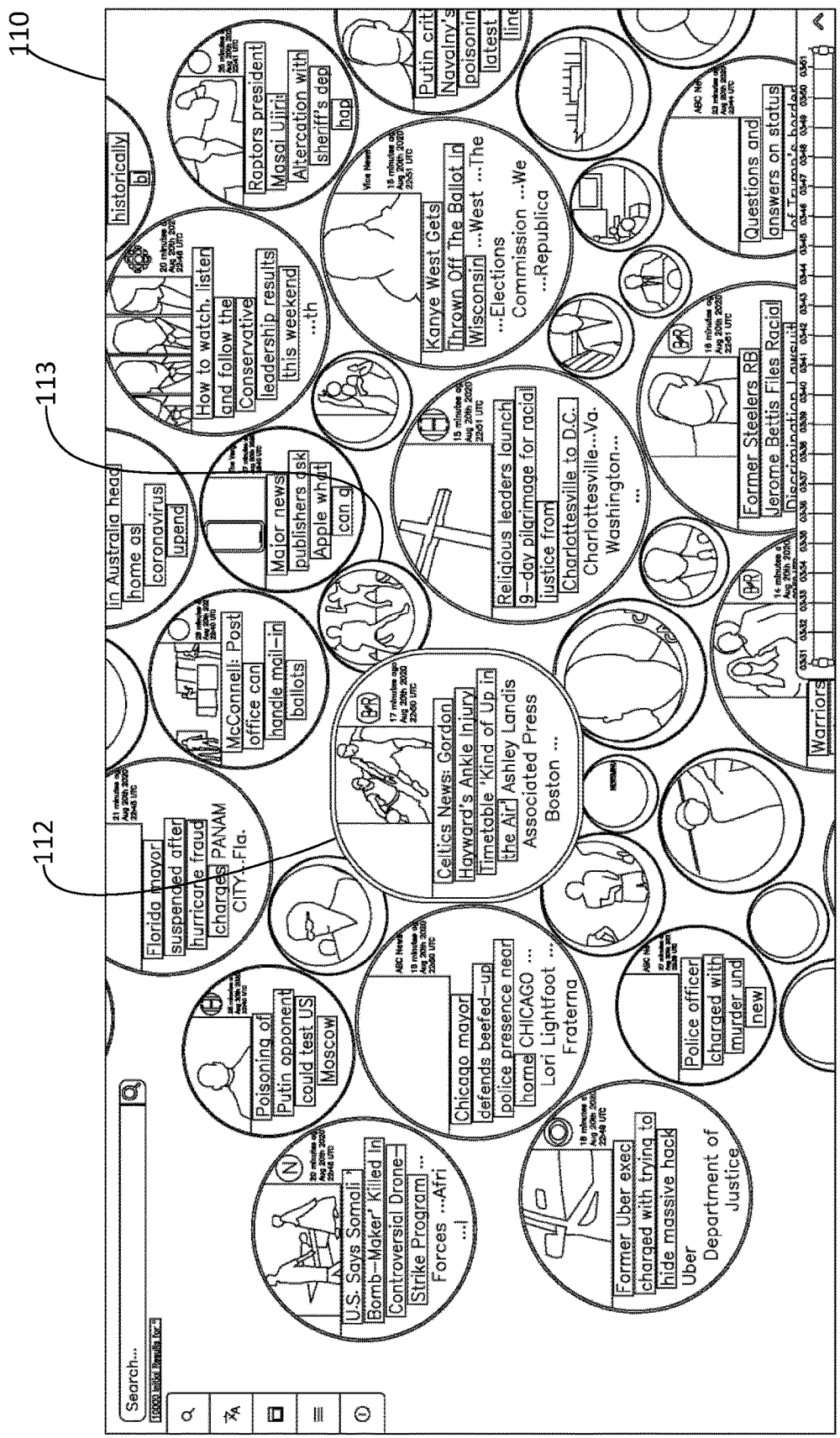
Figure 3C:
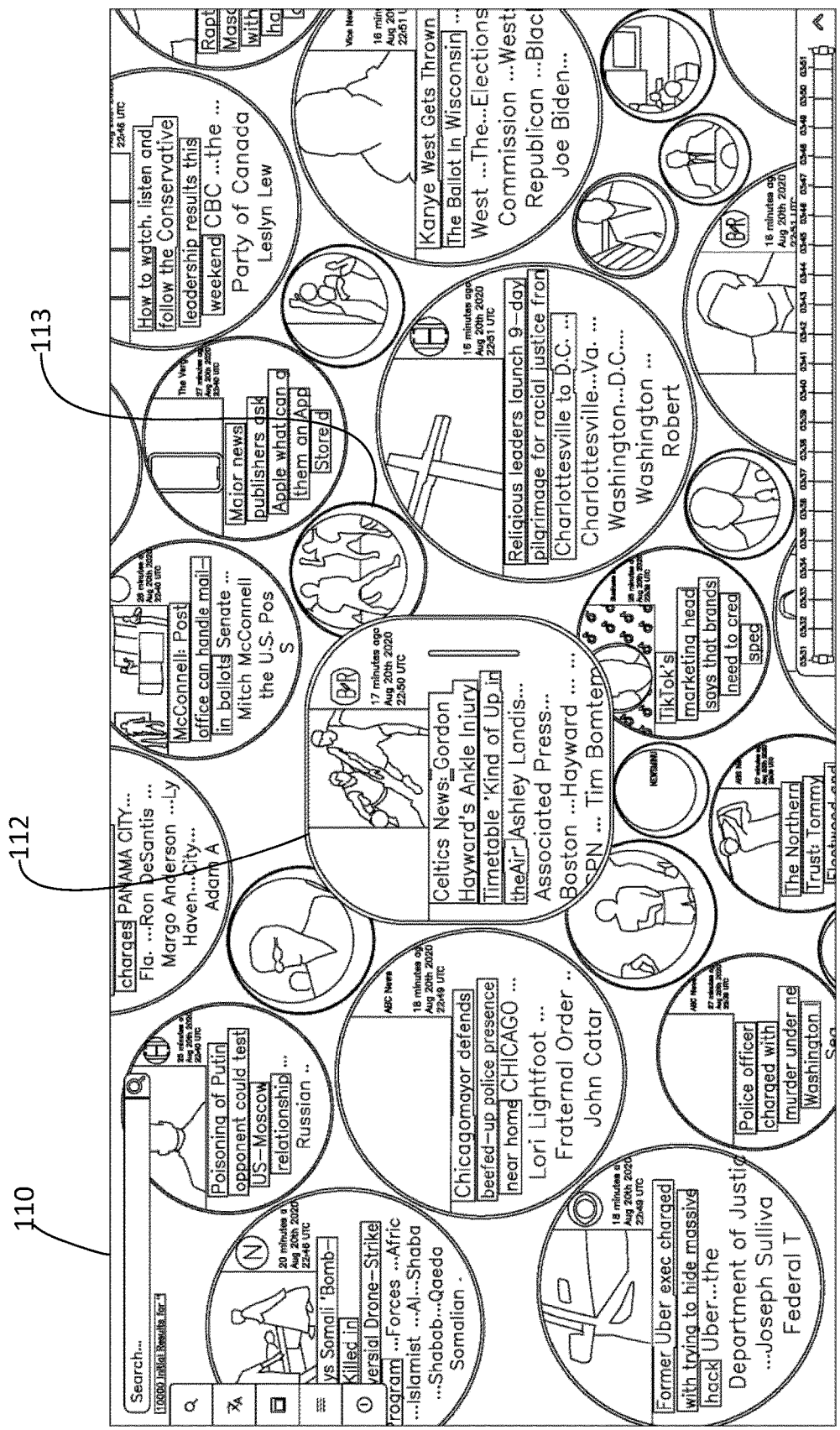
Figure 3D:
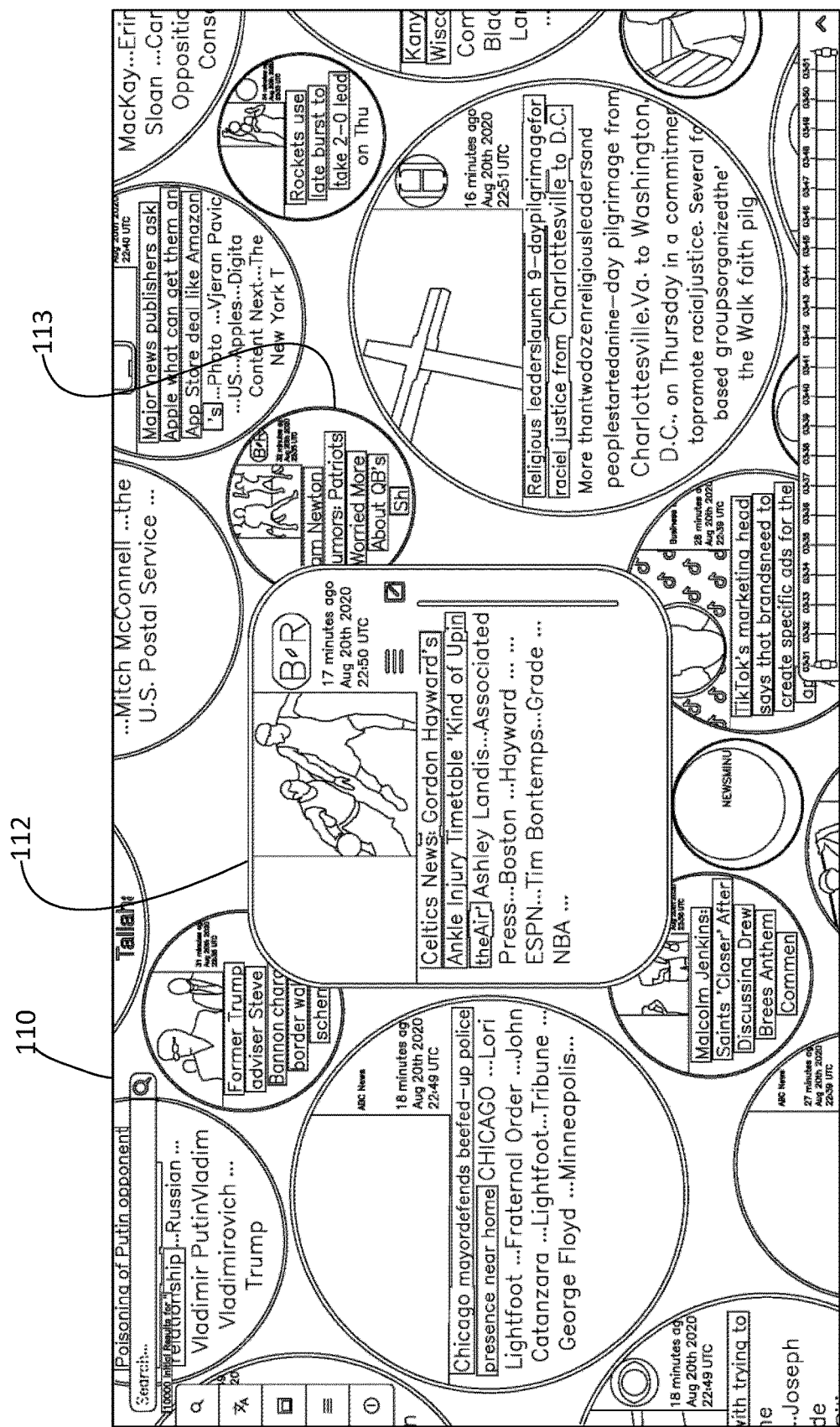
Figure 3E:
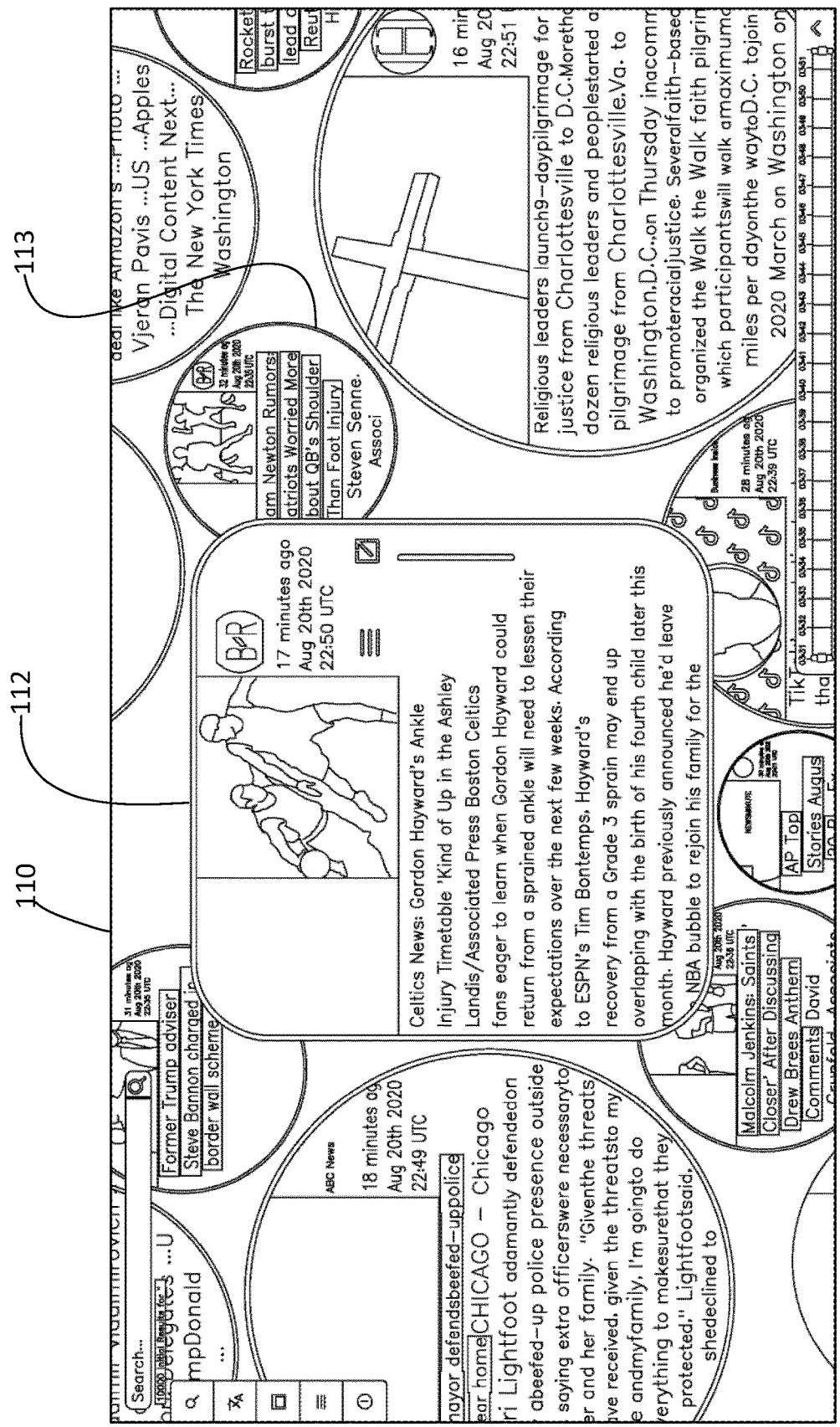
Figure 3F:
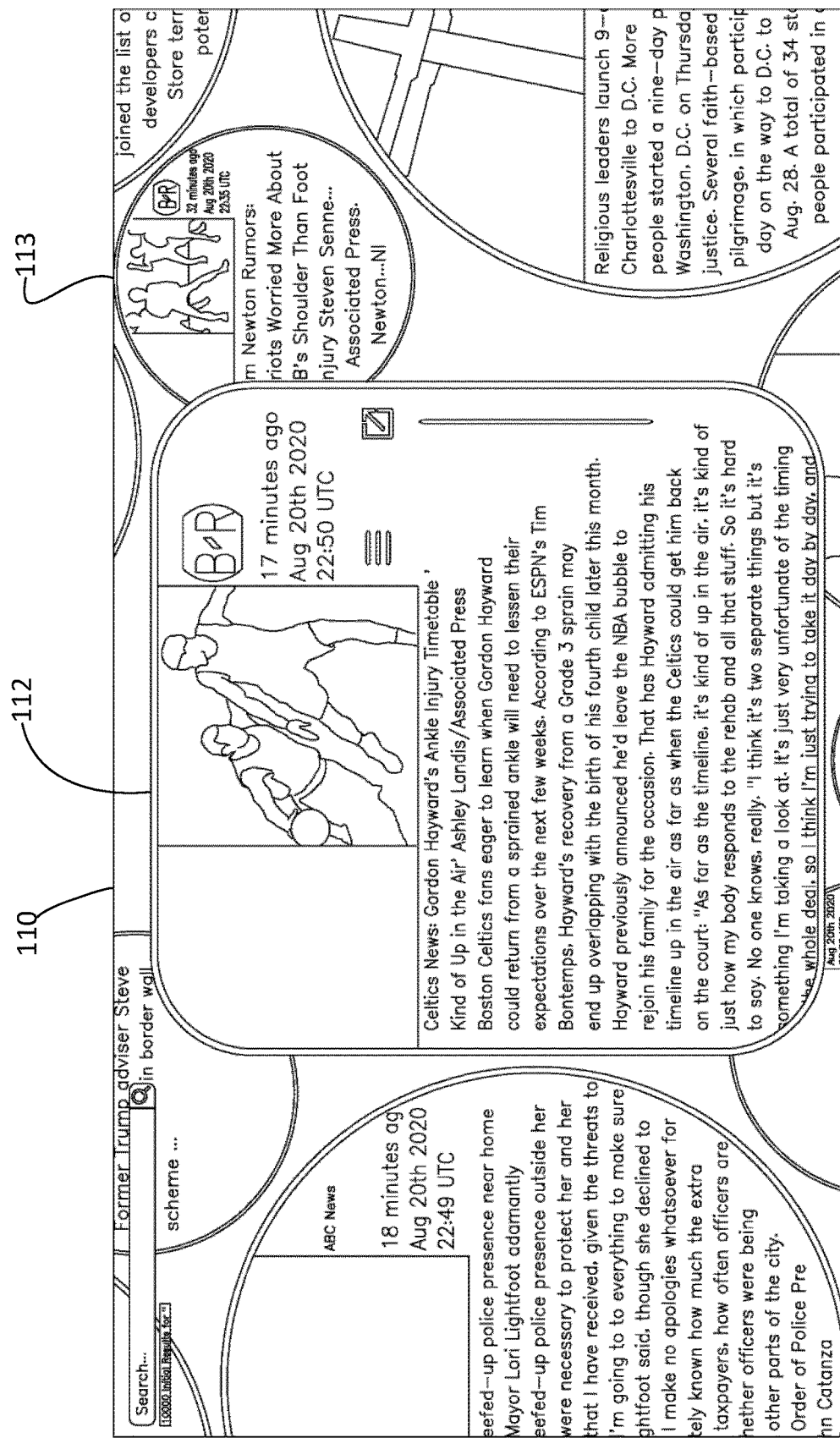

FIGS. 3A-3F represent exemplary animation frames from a rendering of a zoom to Bubble 112, beginning with a relatively small rendering of Bubble 112 in FIG. 3A and ending in a full-text view in Bubble 112 in FIG. 3F. Such zoom may be in response to a fast zoom, a focus, or single focus indication by the user.

III.4 Focus Tracking and Exposure

The amount of time a user spends focused to a high level of zoom on a Document may be tracked. In some embodiments, if the time exceeds a threshold, then the Bubble may be "dimmed"—i.e., an effect to gray out and reduce the contrast of the Bubble. In this way, as the user moves from looking in detail at Bubble to Bubble, she will leave a trail of "dimmed" bubbles and will easily be able to see what she has read.

The present inventor has disclosed similarly useful techniques in U.S. patent application Ser. No. 12/603,767, filed Oct. 22, 2009, which is hereby incorporated in its entirety for all purposes.

IV. Sophisticated Rendering of Text

IV.1 Emphasis based on Natural Language Processing

When text is rendered, the size can be modulated on a word-by-word basis to reflect its importance. More critical words can be emphasized more heavily with a larger font or bolder font attributes or other characteristics. The benefit of this emphasis-based font rendering is that the text is easier to read quickly or skim. It is easier to find the parts of the Document that the reader is actually interested in.

To determine the importance of each word and how it should be rendered, Natural Language Processing (NLP) can be used. NLP is used to get Parts-of-Speech (POS) tags such as "Proper Noun", "Adjective", "Verb". NLP is also used for Named Entity Recognition (NER). For each word or phrase, NER will identify it as a "Geographic Placename", "Person", "Institution", etc. NLP can be implemented in a variety of ways, from older rule-based systems to neural networks. In some embodiments, statistical NLP models are used, but the technique can be used with any NLP process.

In addition to NER and POS tagging, the NLP process "tokenizes" the text—that is, it splits the continuous string of text into a list of words or parts of words called tokens. The NER and POS tags are associated with tokens.

When the text is rendered, the tokens are reassembled, assigning emphasis on each token based on the part of speech or presence of a named entity. Proper Nouns like "Detroit", for example, are emphasized more than the article "The" or conjunction "and".

FIG. 7 illustrates text which has been rendered using NLP-based Emphasis to increase font size of proper nouns, e.g., "Harvard" 71 and "MIT" 72, and decrease the size of words such as "said" 73 and "and" 74.

IV.2 Combining sources of Emphasis and Text Fragments

When rendering NLP processed text it is often desirable to combine many factors of emphasis and styling into one layout and rendering. For example, it may be desirable to enlarge the words around a keyword to provide context, while also enlarging and changing the color of a possibly overlapping sentence, while "pushing" the default text to be small and not visible. It is further desirable to smoothly adjust these competing styles over periods of time; for example, removing the emphasized sentence over several seconds.

In one embodiment, the text if first run through Natural Language Processing which breaks the characters of the text into tokens (roughly, words), and sentences. Each token has a sequential index associated with it.

One unit of styling is called an "Emphasis". An Emphasis specifies a location in the list of NLP tokens that make up the body of the text. A location is specified as a token index, or a continuous range of indices, or a central index for a decay function. A decay function can determine how the effect of styling from a particular Emphasis is diminished for tokens farther from the center index. In some embodiments, a gaussian function with a standard deviation in index units defining the rapidity of decay is used.

An Emphasis can include not just location but can also define the styling for the rendered text. The style information can be font size multipliers, foreground or background color, aspect ratio, visibility, or any other attribute commonly associated with text rendering. Each Emphasis does not need to specify all possible attributes.

A special "visibility" attribute may be used in conjunction with a global "visibility threshold". Visibility can be weighted and decayed like any other style attribute, but if it falls below the visibility threshold for a particular token index then that token is not rendered. Adjustment of the visibility threshold allows an easy way to control how much information is displayed in a fixed area.

An Emphasis may also include a "weight". When multiple Emphases overlap a particular token index location with the same style attribute (such as size), the style specified from each Emphasis is combined using a weighted mean of the Emphases. The weight is optionally decayed using a decay function as described above.

The "Layout Engine" generates an HTML Document Object Model (DOM) for the Hypertext Markup Language (HTML) containing the exact position and style attributes of the text for rendering by a web browser or other HTML rendering engine. The technique is readily applicable to other text rendering environments.

A list of multiple Emphases is provided to the Layout Engine along with the tokenized text. For each token, the Layout Engine retrieves a list of Emphases affecting that location, computes the weighted mean of any conflicting styles, and applies that style to the token. Styles such as size also affect the rendering and positioning of text.

One of the benefits of this Emphasis system is that changes to Emphasis can be easily and smoothly applied. For example, to shrink a sentence from the rendering smoothly over the course of a few seconds a single Emphasis just needs to adjust its weight and font size multiplier. There is no need to run through the entire text attempting to tweak font attributes before running the Layout Engine.

An optimization may be necessary to lookup Emphases quickly that match the location index for each token. This can be expensive for the Layout Engine to attempt to apply all Emphases for each index. To improve this performance dramatically, a lookup table can be created which maps index locations to lists of all relevant Emphases.

IV.3 Focus Word Bidirectional Layout

FIG. 8 illustrates sample text on which Emphasis has been applied at the word level. The user is perhaps interested in more detail around the word "Iraqi" 81. This can be accomplished by increasing the size emphasis for the text before and after the word Iraqi. However, in a traditional text layout engine—such as a web browser—once the text before the word "Iraqi" is modified, then the position of the word "Iraqi" will be lost; it will either be rendered before or after its previous position.

It can be desirable to allow the user to "zoom in" on a word and get more contextual information. If the word position is lost, then the user will be disoriented and the effect is lost. This is especially true when manipulating heavily emphasized text as described in the previous sections.

To solve this problem, an inventive bidirectional layout algorithm is applied. Such an algorithm starts with a "focus word" at a fixed position. Like a conventional layout engine, the algorithm places following words in succession until the text box is full or there is no text remaining. However, the algorithm then returns to the initial focus word and, starting from the focus position, it places previous words in backwards order, including optional word breaks at the line edges.

This bidirectional layout mechanism allows user interface experiences such as: a user positioning their mouse over a word, using the scroll wheel to "zoom in" on the word, and have the text layout responsively increase the detail around that word while leaving the word under the mouse pointer.

IV.4 Sub-Character Line Breaks for Smooth Text Transitions

Smooth transitions between text layouts is also a concern. When a user resizes a text area or commands a gradual change to the formatting of a laid-out text, then the transition should be fluid and not disorienting to the user.

One source of disorientation is the use of word-breaks. Word breaks cause a word to wrap to the next line if it does not fit on the remainder of the current line. If a user changes the size of a window of text with word-breaks enabled, then the change in layout is abrupt and distracting. This can be improved by turning off word-breaks. Most current layout engines, such as that found in a modern web browser, will break the words at the granularity of a single letter or character. Unfortunately, that is not enough to fix the jarring experience.

An inventive Layout Engine instead can be configured to break words at the sub-character pixel level. This allows smooth transitions between layouts that are not disorienting—especially when combined with the Focus Word Bidirectional Layout described earlier.

FIG. 8 illustrates exemplary sub-character line breaks such as the "D" 82A and 82B in "Dubai" and the "y" 83A and 83B in "Syria."

Words broken at the pixel level, however, can be difficult to read. This is addressed by using a timed transition when the user is idle. After the user's command (window resize, refocus, etc.) is complete and the transition is done, and the user is idle for a certain time, e.g., one to three seconds, the words are shifted back to word-break in their new positions, using a smooth transition over half a second or so.

V. Computing and Network Environment

Figure 9:
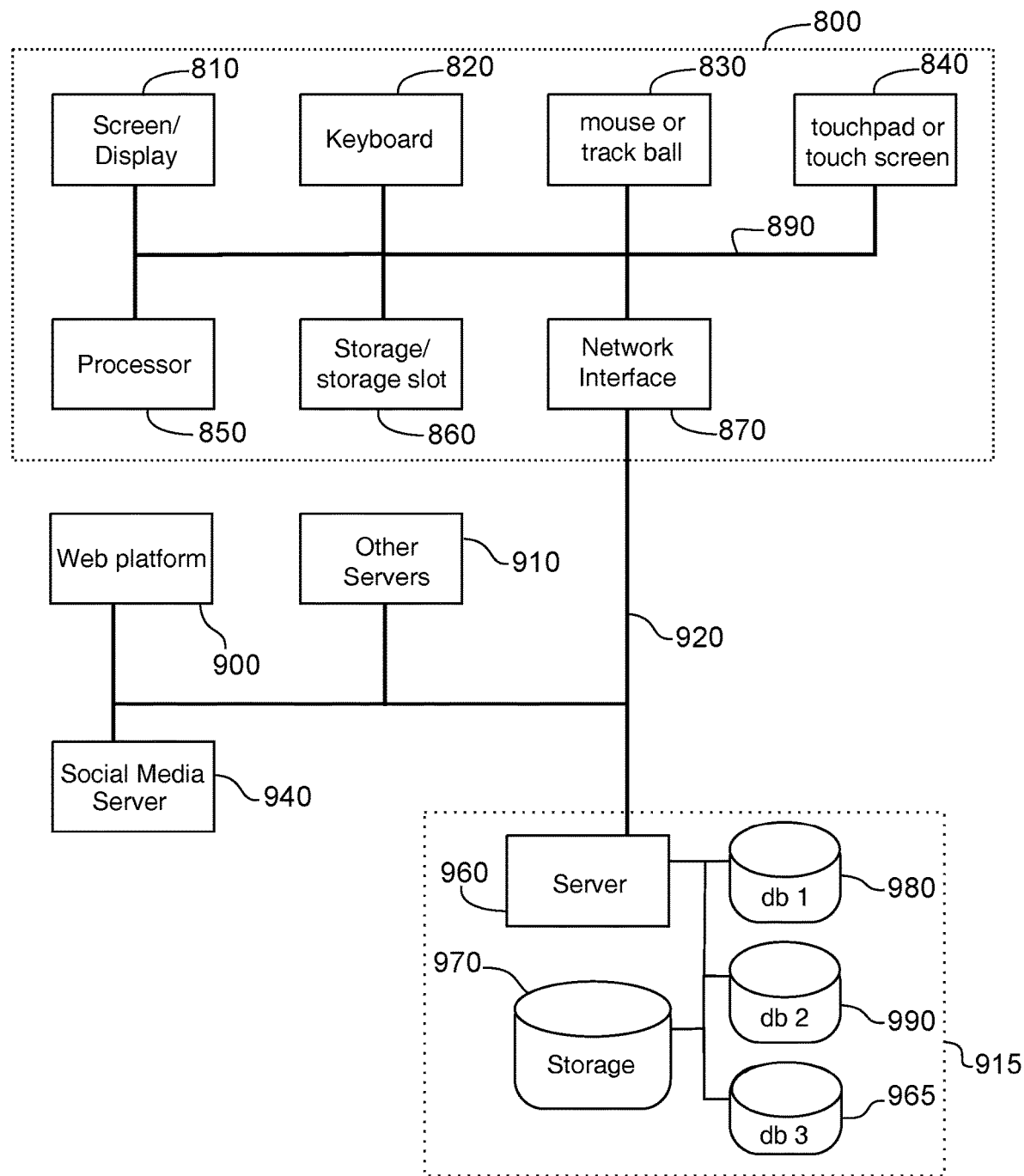
FIG. 9 illustrates an exemplary computing and network environment for aspects of the invention.

With reference to FIG. 9, aspects of an exemplary computing and network environment of the invention are illustrated. For example, a computer platform 800 for user interaction is provided. Computer platform 800 could be, by way of example, a desk-top computer, a tablet-style computer, a laptop, or a smart phone. Computer platform 800 includes a display 810, a processor 850, storage 860, a network interface 870, and input devices such as keyboard 820, mouse 830, or touch screen 840. Processor 850, storage 860 and other computer platform elements may be interconnected by bus 890. Storage 860 may optionally include a storage slot in which removable storage devices may be inserted. The computer platform is configured with processor executable instructions accessed from storage 860 for carrying out interaction with the user and retrieval and storage of information. Information may be stored via storage/storage slot 860 or may be stored on a network accessible resource such as file storage server 950 and data store 930. Network interface 870 may be a wire-line or wireless network interface.

Computer platform 800 may be connected via network interface 870 to network 920. Network 920 may be the internet. Network 920 allows computer platform 800 to communicate with, for example, web platform 900, other servers 910, and social media server 940. Also, network 920 permits communication with search provider 915. Provider facility 915 may include a server 960 connected with network 920, code storage 970 and document databases 980, 990 and 965.

Data and computer processor instructions for carrying the inventive methods may be stored on computer platform 800 in, e.g., storage/storage slot 860, or at search provider facility server 960. Processor 850, servers 900, 940, or 960 may carry out one or more steps of the inventive methods.

What is claimed is:

1. A method for rendering of text in a combination of styles and sizes to a computer graphics display with a rendering engine, the method comprising steps of:
   running the text through a Natural Language Processing module to break the text into word or character tokens, each token having an associated sequential index according to its order in the text;
   instantiating a set of Emphases, where each Emphasis specifies a parameter for styling of text and a position index or range of positions indicating how the Emphasis affects the rendering of tokens in the text, wherein multiple Emphases may affect any given token and the Emphases may overlap;
   combining typographical attributes of multiple Emphases by a weighted average, a linear combination of attributes, or a mathematical transformation;
   mapping the set of weighted Emphases to the typographical attributes of the text corresponding to each token by combining relevant Emphases styles; and
   rendering, using the rendering engine, each token according to its typographical attributes to the graphics display.

2. The method as claimed in claim 1, wherein mapping the set of weighted Emphases is performed by specifying a range comprising a start position and an end position, and a fixed weight for each Emphasis to the text corresponding to the tokens within the specified range.

3. The method as claimed in claim 1, wherein mapping the set of Emphases includes specifying for each Emphasis a weight, a token index for a center, and a standard deviation, and then calculating the weight for each Emphasis for a token using a distance from the token index to the Emphasis center and computing a weight using a gaussian decay function with the standard deviation.

4. The method according to claim 1, wherein an attribute of one or more Emphases is incrementally modified to produce a series of renderings of the text which may be displayed as a smooth animation or manipulation of the text.

5. The method according to claim 4, wherein the incrementally modified attribute is one of weight, position, and color.

6. The method according to claim 1, wherein typographical attributes include at least style, size, and color.

7. A computing device comprising: at least one processor; a graphics display; and
   a computer-readable medium having encoded thereon computer-executable instructions to cause the at least one processor to perform operations comprising:
   running a text through a Natural Language Processing module to break the text into word or character tokens, each token having an associated sequential index according to its order in the text;
   instantiating a set of Emphases, where each Emphasis specifies a parameter for styling of text and a position index or range of positions indicating how the Emphasis affects the rendering of tokens in the text, wherein multiple Emphases may affect any given token and the Emphases may overlap;
   combining typographical attributes of multiple Emphases by a weighted average, a linear combination of attributes, or a mathematical transformation;
   mapping the set of weighted Emphases to the typographical attributes of the text corresponding to each token by combining relevant Emphases styles; and
   rendering, using a rendering engine, each token according to its typographical attributes to the graphics display.

8. The computing device as claimed in claim 7, wherein mapping the set of weighted Emphases is performed by specifying a range comprising a start position and an end position, and a fixed weight for each Emphasis to the text corresponding to the tokens within the specified range.

9. The computing device as claimed in claim 7, wherein mapping the set of Emphases includes specifying for each Emphasis a weight, a token index for a center, and a standard deviation, and then calculating the weight for each Emphasis for a token using a distance from the token index to the Emphasis center and computing a weight using a gaussian decay function with the standard deviation.

10. The computing device according to claim 7, wherein the weight, position, or other attribute of one or more Emphases is incrementally modified to produce a series of renderings of the text which may be displayed as a smooth animation or manipulation of the text.

11. The computing device according to claim 10, wherein the incrementally modified attribute is one of weight, position, and color.

12. The computing device according to claim 7, wherein typographical attributes include at least style, size, and color.

* * * * *